United States Patent [19]

Suzuki et al.

[11] Patent Number: 4,872,958

[45] Date of Patent: Oct. 10, 1989

[54] ION EXCHANGE MEMBRANE FOR ELECTROLYSIS

[75] Inventors: Koji Suzuki, Yokohama; Tetsuro Tsukada, Machida; Yoshihiko Saito; Kiyotaka Arai, both of Yokohama; Hiroshi Mori, Yokohama, all of Japan

[73] Assignee: Asahi Glass Company, Ltd., Tokyo, Japan

[21] Appl. No.: 206,914

[22] Filed: Jun. 15, 1988

Related U.S. Application Data

[63] Continuation of Ser. No. 59,770, Jun. 8, 1987, abandoned.

[30] Foreign Application Priority Data

Jun. 13, 1986 [JP] Japan ................................ 61-136217
Jun. 26, 1986 [JP] Japan ................................ 61-148176
Jun. 27, 1986 [JP] Japan ................................ 61-149682

[51] Int. Cl.$^4$ ..................... C25B 1/16; C25B 1/26; C25B 13/08
[52] U.S. Cl. ..................... 204/98; 204/128; 204/252; 204/296; 521/27
[58] Field of Search ................................ 204/283, 282

[56] References Cited

U.S. PATENT DOCUMENTS 4,586,992  5/1986  Miyake et al. ...................... 204/296
4,610,764  9/1986  Asawa et al. .
4,686,120  8/1987  Johnson ............................. 204/296

FOREIGN PATENT DOCUMENTS 61594   10/1982  European Pat. Off. .
94587   11/1983  European Pat. Off. .
165466  12/1985  European Pat. Off. .

*Primary Examiner*—John F. Niebling
*Assistant Examiner*—Kathryn Gorgos
*Attorney, Agent, or Firm*—Oblon, Spivak, McClelland, Maier & Neustadt

[57] ABSTRACT

An ion exchange membrane for electrolysis comprising a first layer of a fluoropolymer having carboxylic acid groups as its ion exchange groups and facing a cathode, a second layer of a fluoropolymer having ion exchange groups, a specific resistance lower than that of the first layer and a thickness of at least 50% of the total thickness of the membrane, and a third layer of a fluoropolymer having ion exchange groups, a swelling degree higher by at least 5% than that of the second layer and a specific resistance lower by at least 30 $\Omega$.cm than that of the second layer, the first, second and third layers being laminated in this order.

28 Claims, No Drawings

ION EXCHANGE MEMBRANE FOR ELECTROLYSIS

This application is a continuation of application Ser. No. 59,770, filed on June 8, 1987, now abandoned.

The present invention relates to a fluoropolymer ion exchange membrane for electrolysis. More particularly, the present invention relates to a fluoropolymer cation exchange membrane having excellent electrochemical properties and mechanical strength, which is useful particularly for the electrolysis of an aqueous alkali metal chloride solution.

For the production of an alkali metal hydroxide and chlorine by the electrolysis of an aqueous alkali metal chloride solution, it has become common to employ an ion exchange membrane method in recent years. The ion exchange membrane to be used in this method is required to have high current efficiency and low membrane resistance, and at the same time, it is required to have high mechanical strength for its handling.

For this purpose, a double-layer type ion exchange membrane has been proposed which comprises an ion exchange film layer having a high electric resistance and a low water content and an ion exchange film layer having a low electric resistance and a high water content, wherein a support web such as a woven fabric or non-woven fabric is embedded for reinforcement (European Patent Publication No. 165466, Japanese Unexamined Patent Publication No. 132089/1978, etc.). Such a membrane provides a fairly high performance.

Further, a laminated membrane structure has been proposed so that the water content or water permeability is reduced gradually from the anode side of the membrane towards the cathode side (U.S. Pat. Nos. 4,610,764 and 4,486,277).

Further, a membrane structure has been proposed in which a laminated membrane comprising a sulfonic acid polymer layer and a carboxylic acid polymer layer is reinforced with a fabric comprising sacrificial material and reinforcing material, for the purpose of electrolysis at a low voltage with a high current efficiency while maintaining the mechanical strength (U.S. Pat. No. 4,437,951).

The ion exchange membrane without any reinforcement is susceptible to tearing and has a practical problem also in the dimensional stability in that the membrane undergoes expansion and contraction depending upon the change in the concentration of the electrolyte. Reinforcement with a cloth is most effective to overcome the above drawbacks and to improve the mechanical strength and dimensional stability of the ion exchange membrane. However, when a reinforcing cloth is used, it is impossible to avoid an increase of the membrane resistance due to a reduction of the conductive surface area. For the purpose of reducing the membrane resistance, it is effective to laminate on the anode side of the membrane a polymer layer having a low electric resistance and a high water content. However, in such a case, the salt content in the alkali metal hydroxide solution tends to increase, such being undesirable.

It is an object of the present invention to overcome the above-mentioned problems and to provide an ion exchange membrane having excellent mechanical strength and dimentional stability, and also excellent electrochemical properties (low membrane resistance and high current efficiency), whereby the salt content in the aqueous alkali metal hydroxide solution resulting in the cathode compartment can be minimized. The present invention is intended to overcome the conventional problems in a fluoropolymer ion exchange membrane such that the one made of a fluoropolymer having a small ion exchange capacity has high mechanical strength and low leakage of the salt, but has a drawback that the membrane resistance is high, and the one made of a fluoropolymer having a high ion exchange capacity has a low membrane resistance, but has a drawback that the mechanical strength is low and the leakage of the salt is substantial.

The present invention provides an ion exchange membrane for electrolysis comprising a first layer of a fluoropolymer having carboxylic acid groups as its ion exchange groups and facing a cathode, a second layer of a fluoropolymer having ion exchange groups, a specific resistance lower than that of the first layer and a thickness of at least 50% of the total thickness of the membrane, and a third layer of a fluoropolymer having ion exchange groups, a swelling degree higher by at least 5% than that of the second layer and a specific resistance lower by at least 30 $\Omega$.cm than that of the second layer, the first, second and third layers being laminated in this order.

The present inventors have discovered that the presence of the above third layer on an anode side plays an important role in the cation exchange membrane for electrolysis, i.e. the presence of the third layer serves to reduce the electric resistance of the entire membrane. Namely, when such a third layer is present, the membrane resistance should be increased to some extent by its presence. Nevertheless, it has been found that the overall resistance of the membrane is smaller as compared with the membrane having no such a third layer. This discovery is not only surprising but also very useful in that even if a fluoropolymer having a high membrane resistance is used as another layer of the membrane to provide excellent electrical or mechanical properties, it is possible to prevent an increase of the overall membrane resistance.

Now, the present invention will be described in detail with reference to the preferred embodiments.

In the present invention, the first layer of a fluoropolymer having carboxylic acid groups (—COOM wherein M is a hydrogen atom or an alkali metal) and facing the cathode side, is preferably made of a hydrolyzed copolymer of tetrafluoroethylene with

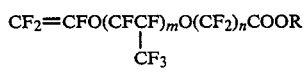

wherein m is 0 or 1, n is from 1 to 5 and R is an alkyl group having from 1 to 10 carbon atoms, which preferably has an ion exchange capacity of from1 0.5 to 1.5 meq/g dry resin (Na-type), more preferably from 0.8 to 1.3 meg/g dry resin (Na-type). If the ion exchange capacity is lower or higher than the above range, the current efficiency tends to be low. Further, the first layer preferably has a specific resistance of from 100 to 4,000 $\Omega$.cm, more preferably from 200 to 3,000 $\Omega$.cm (as measured at 25° C. in a 12 wt % NaOH aqueous solution). The thickness of the first layer is preferably from 5 to 50 $\mu$m, more preferably from 10 to 40 $\mu$m. If the thickness of the first layer is too thin, the electrolytic conditions such as the current efficiency and the purity of the resulting alkali metal hydroxide will be unstable, and if the thickness is too great, the membrane resistance will be too high.

The second layer of a fluorocarbon polymer having a specific resistance lower than that of the first layer and a thickness of at least 50% of the total thickness of the membrane, is preferably made of a perfluorocarbon polymer having carboxylic acid groups or sulfonic acid groups (—SO$_3$M wherein M is as defined above) as its ion exchange groups. When the ion exchange groups are carboxylic acid groups, the second layer may be made of the same type of polymer as the polymer of the first layer, but the ion exchange capacity is preferably selected within a range of from 0.8 to 2.0 meq/g dry resin, more preferably from 0.9 to 1.8 meq/g dry resin, and the membrane resistance must be smaller than the first layer. On the other hand, when the ion exchange groups are sulfonic acid groups, the second layer is preferably made of a hydrolyzed copolymer of a tetrafluoroethylene with

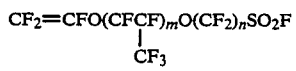

wherein m is 0, 1 or 2 and n is from 1 to 5, which preferably has an ion exchange capacity of from 0.5 to 1.5 meq/g dry resin, preferably 0.9 to 1.4 meq/g dry resin. The membrane resistance of the second layer is lower by at least 10 Ω.cm, preferably 30 Ω.cm than that of the first layer, and is preferably from 20 to 1,500 Ω.cm, more preferably from 30 to 1,000 Ω.cm. The thickness of the second layer preferably constitutes the main layer of the membrane, and is at least 50%, preferably at least 65%, of the total thickness of the membrane, and is preferably from 50 to 200 μm, more preferably from 100 to 150 μm. If the thickness of the second layer is thin, the contribution to the overall strength of the membrane tends to be small, such being undesirable.

The third layer of a fluoropolymer has a swelling degree higher by at least 5%, preferably at least 10%, than that of the second layer and a specific resistance lower by at least 30 Ω.cm, preferably at least 50 Ω.cm, than that of the second layer. The specific resistance of the third layer is preferably from 10 to 1,000 Ω.cm, more preferably from 20 to 500 Ω.cm. If the difference in the swelling degree is smaller than the above range, the effect for reducing the membrane resistance tends to be small.

The thickness of the third layer is less than that of the second layer, and preferably ½ or less than the main layer. The thickness is preferably from 10 to 50 μm. For the purpose of the present invention, the swelling degree is a value obtained from the following equation $$\Delta W = (W_1 - W_2)/W_2 \times 100 \ (\%)$$

where ΔW is a swelling degree, W$_1$ is the weight of the membrane after it was subjected to dipping treatment in 12% NaOH at 90° C., and the deposited alkali was removed after cooling, and W$_2$ is the same membrane after it was washed with water to remove the absorbed alkali and dried until the moisture was removed.

As the fluorocarbon polymer for the third layer, it is preferred to employ a fluorocarbon polymer of the same type as the polymer constituting the first or second layer having carboxylic acid groups and/or sulfonic acid groups. It is particularly preferred to employ a polymer of the same type as used for the second layer from the viewpoint of the adhesion of the layers. The ion exchange capacity is preferably selected within a range of from 1.0 to 2.5 meq/g dry resin in order to provide a large swelling degree as mentioned above.

The cation exchange membrane of the present invention comprises at least three layers i.e. the above-mentioned first, second and third layers. It may have an additional layer as the case requires. For example, on the anode side of the third layer, a fourth layer of a fluorocarbon polymer preferably having a specific resistance higher by from 5 to 150 Ω.cm, more preferably from 10 to 100 Ω.cm than the specific resistance of the third layer and preferably having sulfonic acid groups, may be provided to increase the strength of the membrane. The thickness of the fourth layer is preferably from 5 to 50 μm, more preferably from 10 to 40 μm.

When two adjacent layers have different ion exchange groups, an additional layer of a fluorocarbon polymer having both carboxylic acid groups and sulfonic acid groups may be interposed between the adjacent layers to improve the adhesion between the two layers. For example, a layer of a fluorocarbon polymer having carboxylic acid groups and sulfonic acid groups may be disposed between the first and second layers, or between the second and third layers. As such an additional layer, a fluorocarbon polymer obtained by the copolymerization of a carboxylic acid type monomer and a sulfonic acid type monomer, may be employed. However, it is preferred to employ a polymer blend comprising a carboxylic acid type fluorocarbon polymer and a sulfonic acid type fluorocarbon polymer. As such polymers, fluorocarbon polymers of the same type as used for the above-mentioned first to third layers are used. The thickness of such an additional layer should not be large in view of its purpose, and is preferably from 5 to 30 μm, more preferably from 5 to 20 μm.

The fluoropolymer used for the first to fourth layers and any additional layer constituting the laminated membrane is preferably made of a perfluoropolymer. Such a perfluorocarbon polymer is a copolymer of at least two kinds of monomers, and is preferably a copolymer having the following polymer units (i) and (ii):

wherein each of X and X' is —F, —Cl, —H or —CF$_3$, A is —SO$_3$M or —COOM wherein M is hydrogen or an alkali metal or a group which can be converted to such groups by hydrolysis, Y is selected from the following groups:

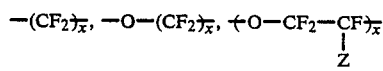

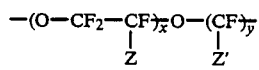

wherein each of Z and Z' is —F or a perfluoroalkyl group having from 1 to 10 carbon atoms, and each of x and y is an integer of from 1 to 10.

The molar ratio of (i)/(ii) in the above polymer is selected so that the fluoropolymer will have the abovementioned ion exchange capacity and specific resistance.

The fluoropolymer is preferably a perfluorocarbon polymer, which includes, as preferred examples, a copolymer of $CF_2=CF_2$ with $CF_2=CFOCF_2CF(CF_3)OCF_2CF_2SO_2F$, a copolymer of $CF_2=CF_2$ with $CF_2=CFO(CF_2)_{2.5}SO_2F$, a copolymer of $CF_2=CF_2$ with $CF_2=CFO(CF_2)_{1.5}COOCH_3$, and a copolymer of $CF_2=CF_2$ with $CF_2=CFOCF_2CF(CF_3)O(CF_2)_{2.3}COOCH_3$.

The ion exchange membrane of the present invention may be prepared preferably by forming the first, second, third layers and, if necessary, the composite layer, separately in the prescribed film forms, and integrally laminating these layers. As the method for the integral lamination of the layers, there may be mentioned flat plate pressing 25 or roll pressing. The temperature for pressing is usually from 60° to 280° C., and the pressure is from 0.1 to 100 kg/cm$^2$ by the flat plate pressing and from 0.1 to 100 kg/cm by roll pressing.

In the present invention, the film-forming for each layer or the mixing for the preparation of the blend composite film layer may be conducted by various conventional methods. For instance, the mixing may be conducted in a wet system by using an aqueous dispersion, an organic solution or an organic dispersion of an ion exchange group-containing perfluorocarbon polymer. The film forming can be conducted by a casting method by using such an organic solution or organic dispersion. Of course, the dry blending system may be employed, or the film formation may be conducted by a heat melting molding method. When a film for each layer is formed by the heat melting molding method, the ion exchange groups of the starting polymer should take a suitable form not to lead to decomposition thereof. For instance, in the case of carboxylic acid groups, they should preferably take a form of an acid or an ester, and in the case of sulfonic acid groups, they should preferably take a form of $-SO_2F$. Alternatively, the starting material polymer may firstly be pelletized by heat melting molding, and then molded by extrusion or press molding into a film.

The ion exchange membrane of the present invention usually has a total thickness of from 100 to 400 $\mu$m, preferably from 100 to 300 $\mu$m. If necessary, it may preferably be reinforced by inserting a support web, preferably, a woven fabric such as a cloth or a net, or a non-woven fabric, preferably made of e.g. polytetrafluoroethylene, or by a metallic mesh or perforated sheet, preferably between the second and third layers or between the third and fourth layers. Otherwise, the membrane of the present invention may be reinforced by blending preferably into the second and third layers, fibrillated fibers of polytetrafluoroethylene as disclosed in e.g. Japanese Unexamined Patent Publications Nos. 149881/1978, 1283/1979, 107479/1979 and 157777/1979, or fibrillated fibers of polytetrafluoroethylene modified by the copolymerization with a small amount of an acid type functional group-containing monomer, as disclosed in e.g. Japanese Unexamined Patent Publication No. 79110/1981. Further, reinforcement may be made by blending a low molecular weight polymer.

It has been found possible to improve the electrochemical properties of the membrane, particularly to substantially reduce the membrane resistance by properly selecting the material of the reinforcing material and the location of the reinforcing material in the membrane Namely, the electric resistance of the membrane can be reduced by reinforcing at least the third layer with a support web composed of sacrificial material and reinforcing material When the fourth layer is present, such a porous substrate is incorporated into at least the third and fourth layers. Here, the sacrificial material is a material which is soluble during the electrolysis or during the hydrolysis treatment of the ion exchange membrane and is preferably made of sacrificial fibers. Further, the support web is disposed at the anode side of the membrane with its cathode side end extending into the third layer so that when the sacrificial fibers are dissolved, voids occupied by the sacrificial fibers constitute passages (perforations) through which the anolyte can penetrate into the third layer. The cathode side of the web may extends to the second layer, but preferably not to the first layer.

According to the present invention, a substantial reduction of the membrane resistance can be accomplished by securing for the anolyte the passages to the third layer having a low electric resistance (specific resistance). If the passages to the third layer are not secured, no distinct effectiveness for the reduction of the membrane resistance can be obtained. As the support web, a knitted fabric, a woven fabric or a nonwoven fabric may be used, and is made of the abovementioned sacrificial material and reinforcing material. The reinforcing material is preferably reinforcing fibers having oxidation resistance and heat resistance to maintain the dimensional stability and mechanical strength. The reinforcing material is preferably a fluorocarbon polymer such as polytetrafluoroethylene, a tetrafluoroethylene-ethylene copolymer or polyvinylidene fluoride. The sacrificial material is preferably a rayon, a nylon, a polyethylene terephthalate or cellulose which is capable of being dissolved during the use for electrolysis or during the chemical treatment with an acid or alkali.

When a woven fabric or a knitted fabric is used as the reinforcing material for the support web, the fibers for such a fabric may be monofilaments, multifilaments or yarns, which preferably have a fineness of from 30 to 300 denier, more preferably from 50 to 200 denier. The cross-section of such fibers may be a circular, a rectangular or a flat shape. However, the fibers preferably have a flat cross-section with an aspect ratio (the ratio of the width to the thickness) of preferably from 2 to 20, more preferably from 4 to 10. The fibers may be flattened by pressing the fibers as they are or by pressing a woven fabric made of the fibers. By using the flatened fibers, it is possible to obtain a reinforcing cloth having a small thickness. The manner of weaving may be plain weave or leno weave.

The support web to be used in the present invention preferably has a thickness of from 30 to 200 $\mu$m, more preferably from 50 to 150 $\mu$m, and the porosity is preferably from 30 to 90%, more preferably from 40 to 80%. The porosity here is meant for the opening rate of the flat surface of the porous substrate of the fluoropolymer, which does not include the sacrificial fibers to be dissolved during the electrolysis. The opening rate is obtained by a photograph taken by an optical microscope.

The ion exchange membrane of the present invention may be prepared by heat-pressing at least the abovementioned first to fourth layers, possibly the additional layer at a temperature of at least the softening temperature of the polymers of the respective layers, for example, at a temperature of from 100° to 250° C., and then embedding the support web to at least the third layer from the anode side of the membrane.

The ion exchange membrane of the present invention may be further improved with respect to the cell voltage under electrolysis, by providing a gas releasing layer on at least one of the anode and cathode sides of the membrane. Such gas releasing layer is porous layer of hydrophilic inorganic particles having no electrocatalytic activity (European Pat. No. 29751), a surface layer of the membrane with its surface roughened. (European Pat. No. 45603).

As the process conditions for the electrolysis of an aqueous alkali metal chloride solution by using the ion exchange membrane of the present invention, conventional conditions as disclosed in the above-mentioned Japanese Unexamined Patent Publication No. 112398/1979 may be employed. For instance, the electrolysis may be conducted preferably at a temperature of from 50° to 120° C. at a current density of from 10 to 100 A/dm$^2$ while supplying preferably a 2.5–5.0N alkali metal chloride aqueous solution to the anode compartment and water or a diluted alkali metal hydroxide to the cathode compartment. In such a case, it is preferred to minimize the presence of heavy metal ions such as calcium or magnesium in the aqueous alkali metal chloride solution, since such heavy metal ions bring about a deterioration of the ion exchange membrane. Further, in order to prevent as far as possible the generation of oxygen at the anode, an acid such as hydrochloric acid may be added to the aqueous alkali metal chloride solution.

The electrolytic cell in which the ion exchange membrane of the present invention is used, may be a monopolar type or bipolar type. With respect to the material constituting the electrolytic cell, for instance, in the case of the anode compartment for the electrolysis of an aqueous alkali metal chloride solution, a material resistant to an aqueous alkali metal chloride solution and chlorine, such as a valve metal like titanium, may be used, and in the case of the cathode compartment, iron, stainless steel or nickel resistant to an alkali hydroxide and hydrogen, may be used.

When an electrode is to be installed in the present invention, the electrode may be disposed in contact with the multi-layer membrane, or may be disposed with a space from the membrane. Particularly in the present invention, it is preferred to dispose the electrode in contact with the membrane, since it is thereby possible to accomplish an advantageous cell voltage attributable to the low membrane resistance, without any trouble.

In the foregoing, the use of the multi-layer type membrane of the present invention has been described primarily with respect to the electrolysis of an aqueous alkali metal chloride solution particularly sodium chloride solution. However, it should be understood that the membrane of the present invention is likewise applicable to the electrolysis of water, a halogen acid (hydrochloric acid or hydrobromic acid) or an alkali metal carbonate.

In the present invention, the mechanism for the reduction of the membrane resistance is not clearly understood. However, it is believed that the third layer having a high swelling degree at the anode side permits the penetration of highly hydrated sodium ions into the membrane, whereby the entire membrane is swelled during the transfer of the sodium ions in the membrane from the anode side to the cathode side, so that the membrane resistance will be reduced. Further, by reinforcing the above third layer with the sacrificial material and reinforcing material, the anolyte is able to penetrate into the interior of the membrane having a low electric resistance, and as a result, the membrane resistance in the vicinity of the anode tends to be close to the liquid resistance, and a substantial effect as if the membrane thickness were reduced, can be obtained.

Now, the present invention will be described in further detail with reference to Examples. However, it should be understood that the present invention is by no means restricted by such specific Examples. In the Examples, the tensile test was conducted by using Tensilon, manufactured by Toyo Baldwin Co., and the tensile strength was measured by means of No. 1 dumbell. The bending test was conducted by using a MIT model bending tester, manufactured by Toyo Seiki Co., with respect to a rectangular sample with a width of 15 mm.

EXAMPLE 1

Film A having an ion exchange capacity of 1.2 meq/g dry resin and a thickness of 30 μm was made of a copolymer of $CF_2=CFO(CF_2)_3COOCH_3$ with tetrafluoroethylene. Likewise, Film B having an ion exchange capacity of 1.0 meq/g dry resin and a thickness of 200 μm and Film C having an ion exchange capacity of 1.3 meq/g dry resin and a thickness of 20 μm, were made of a copolymer of

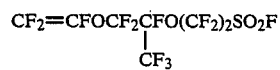

$$CF_2=CFOCF_2CFO(CF_2)_2SO_2F$$
$$|$$
$$CF_3$$

with tetrafluoroethylene. The swelling degrees of Films B and C were 18% and 32%, respectively, and the specific resistance was 80 Ω.cm and 30 Ω.cm, respectively. Films A, B and C were laminated in this order to obtain a three-layered membrane, which was reinforced by press-bonding a woven fabric made of 50 denier polyester sacrificial fibers and 200 denier polytetrafluoroethylene (PTFE) fibers having an aspect ratio 4 (sacrificial fibers: 40 mesh, PTFE fibers: 20 mesh).

Then, a mixture comprising 10 parts by weight of zirconium oxide powder having a particle size of 5 μm, 0.4 part by weight of methyl cellulose (viscosity of its 2% aqueous solution: 1500 centipoise), 19 parts by weight of water, 2 parts by weight of cyclohexanol and 1 part by weight of cyclohexanone, were kneaded to obtain a paste. The paste was screen-printed on the C layer side of the ion exchange membrane prepared by the above lamination, with use of a Tetron screen having 200 mesh and a thickness of 75 μm, a printing plate provided with a screen mask having a thickness of 30 μm beneath the screen and a squeegee made of polyurethane. The printed layer on the membrane surface was dried in air.

Then, on the other side of the membrane having a porous layer thus obtained, β-silicon carbide particles having an average particle size of 0.3 μm were deposited. Thereafter, the particle layers on the respective membrane surfaces were press-fixed to the ion exchange membrane surfaces at a temperature of 140° C. under a pressure of 30 kg/cm$^2$, to obtain an ion exchange membrane with zirconium oxide particles and silicon carbide particles deposited in an amount of 1.0 mg/cm$^2$ and 0.7 mg/cm², respectively on the anode side and the cathode side of the membrane. The ion exchange membrane thus obtained was hydrolyzed in 25% NaOH at 70° C. for 16 hours.

To the C layer side of the membrane thus obtained, an anode prepared by coating a solid solution of ruthenium oxide, iridium oxide and titanium oxide on a titanium punched metal (short opening diameter 4 mm, long opening diameter: 8 mm) and having a low chlorine overvoltage, was pressed to be in contact with the membrane. Likewise, to the A layer side of the membrane, a cathode prepared by electrodepositing a ruthenium-containing Raney nickel (ruthenium: 5%, nickel: 50%, aluminium: 45%) on a SUS 304 punched metal (short opening diameter: 4 mm, long opening diameter: 8 mm) and having a low hydrogen overvoltage, was pressed to be in contact with the membrane. Then, electrolysis was conducted at 90° C. at a current density of 30 A/dm², while supplying a 5N sodium chloride aqueous solution to the anode compartment and water to the cathode compartment, and maintaining the sodium chloride concentration in the anode compartment to a level of 3.5N and the sodium hydroxide concentration in the cathode compartment to a level of 35% by weight.

As the results, the current efficiency was 96.5%, and the cell voltage was 3.10 V. The membrane used for the electrolysis for 10 days was examined, and no abnormality was observed. The tensile elongation of this membrane was 40%, and the MIT type bending fatigue test was 20 times.

COMPARATIVE EXAMPLE 1

The operation was conducted in the same manner as in Example 1 except that Films A and B were laminated to obtain a two-layered membrane, whereby the current efficiency was 96.5%, and the cell voltage was 3.13 V.

COMPARATIVE EXAMPLE 2

The operation was conducted in the same manner as in Example 1 except that Film B made of a copolymer of

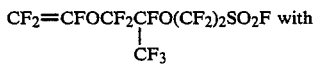

tetrafluoroethylene and having an ion exchange capacity of 1.3 meq/g dry resin and a thickness of 200 μm (swelling degree and specific resistance were the same as Film C), was laminated with Film A to obtain a two-layered membrane, whereby the current efficiency was 96.0%, and the cell voltage was 3.07 V. However, the membrane ruptured when it was taken out after the electrolysis for 10 days. The tensile elongation of this membrane was 10%, and the MIT type bending fatigue test was 5 times.

EXAMPLE 2

Film A having an ion exchange capacity of 1.1 meq/g dry resin and a thickness of 30 μm was made of a copolymer of $CF_2=CFO(CF_2)_3COOCH_3$ with tetrafluoroethylene.

Likewise, Film B having an ion exchange capacity of 0.95 meq/g dry resin and a thickness of 150 μm was made of a copolymer of

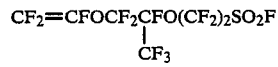

with tetrafluoroethylene. Films A and B were laminated to obtain a two-layered membrane. On the other hand, a polymer having an ion exchange capacity of 1.2 meq/g which is copolymer of

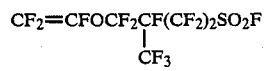

with tetrafluoroethylene, was converted to an acid type, and then dissolved in ethanol to obtain a solution having a concentration of 10% by weight. This solution was cast on the sulfonic acid polymer side of the two-layered membrane, to form a layer having a thickness of 10 μm, whereby a three-layered membrane was obtained. The swelling degrees in 12% NaOH of Film B and the cast layer were 15% and 27%, respectively, and the specific resistance was 100 Ω.cm and 40 Ω.cm, respectively. The subsequent operation was conducted in the same manner as in Example 1 to obtain a cation exchange membrane This membrane was treated in the same manner as in Example 1, and then assembled in an electrolytic cell. The electrolysis was conducted in the same manner as in Example 1, whereby the current efficiency was 96%, and the cell voltage was 3.15 V. The tensile elongation of this membrane was 40%, and the MIT type bending fatigue test was 30 times.

COMPARATIVE EXAMPLE 3

The operation was conducted in the same manner as in Example 2 except that no cast layer was formed, and the electrolysis was conducted with the two-layered membrane, whereby the current efficiency was 96.0%, and the cell voltage was 3.18 V.

EXAMPLE 3

Copolymerization of $CF_2=CFO(CF_2)_3COOCH_3$ and $CF_2=CF_2$ was conducted to obtain perfluorocarbon copolymers having ion exchange capacities of 1.2 meq/g dry resin and 1.4 meq/g dry resin, respectively. These copolymers were 10 extruded to form Films A and B having a thickness of 30 μm and 200 μm, respectively. On the other hand, copolymerization of

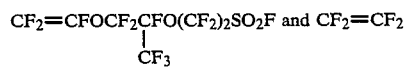

pos was conducted to obtain a polymer having an ion exchange capacity of 1.3 meq/g dry resin. This polymer was extruded to form Film C having a thickness of 10 μm. The swelling degrees of the polymers of Films B and C were 17% and 32%, respectively, and the specific resistance was 150 Ω.cm and 30 Ω.cm, respectively. Further, the polymer of Film B and the polymer of Film C were blended in a weight ratio of 1:1, and then extruded to form Film D having a thickness of 10 μm. Films A, B, D and C were laminated in this order by a heat roll press at 200° C. to form a four-layered film. To this film, a composite woven fabric made of 50 denier polyester sacrificial fibers and 200 denier polytetraethylene (pTFE) fibers having an aspect ratio 4 (sacrificial fibers: 40 mesh, PTFE fibers: 20 mesh) was press-bonded for reinforcement.

Then, in the same manner as in Example 1, an ion exchange membrane was prepared, and by using this membrane, electrolysis of an aqueous sodium chloride solution was conducted in the same manner as in Example 1. The current efficiency was 96.5%, and the cell voltage was 3.05 V. The sodium chloride content in the resulting aqueous sodium hydroxide solution was 27 ppm. The membrane used for the electrolysis for 10 days was examined, and no abnormality was observed. The tensile elongation of this membrane was 40%, and the MIT type bending fatigue test was 20 times.

COMPARATIVE EXAMPLE 4

The operation was conducted in the same manner as in Example 3 except that a two-layered membrane composed solely of Films A and B was prepared. The current efficiency was 96.5%, and the cell voltage was 3.08 V.

EXAMPLE 4

Copolymerization of $CF_2=CFO(CF_2)_3COOCH_3$ and $CF_2=CF_2$ was conducted to obtain polymers having an ion exchange capacities of 1.2 meq/g dry resin, 1.4 meq/g dry resin and 1.8 meq/g dry resin. These polymers were extruded to form Films E, F and G having thicknesses of 30 μm, 200 μm and 20 μm, respectively. The swelling degrees of the polymers of Films F and G were 17% and 34%, respectively, and the specific resistance was 150 Ω.cm and 35 Ω.cm, respectively. Films E, F and G were laminated in this order by a heat roll press at 200° C. to obtain a three-layered membrane. The rest of the operation was conducted in the same manner as in Example 1 to obtain a cation exchange membrane. Further, this membrane was treated in same manner as in Example 1, and the electrolysis was conducted in the same manner. The current efficiency was 96.5%, and the cell voltage was 3.05 V. The tensile elongation of this membrane was 40%, and the MIT type bending fatigue test was 20 times.

COMPARATIVE EXAMPLE 5

In Example 4, a polymer having an ion exchange capacity of 1.8 meq/g dry resin was formed into Film H having a thickness of 200 μm. Films E and H were laminated to obtain a two-layered membrane. The rest of the operation was conducted in the same manner as in Example 4 to obtain a cation exchange membrane The electrolysis was conducted under the same conditions, whereby the current efficiency was 96%, and the cell voltage was 3.00 V. The tensile elongation of this membrane was 15%, and the MIT type bending fatigue test was 5 times.

EXAMPLE 5

Polymers made of a copolymer of $CF_2=CFO(CF_2)_2COOCH_3$ and $CF_2=CF_2$ and having ion exchange capacities of 1.3 meq/g dry resin and 1.5 meq/g dry resin, respectively, were formed into Films I and J having thicknesses of 20 μm and 200 μm, respectively. On the other hand, a polymer made of a copolymer of $CF_2=CFOCF_2 SO_2F$ and $CF_2=CF_2$ and having an ion exchange capacity of 1.5 meq/g dry resin, was formed into Film K having a thickness of 10 μm.

The swelling degrees of Films J and K were 17% and 30%, respectively, and the specific resistance was 140 Ω.cm and 30 Ω.cm, respectively. Films I, J and K were laminated in this order to obtain a three-layered membrane. The rest of the operation was conducted in the same manner as in Example 1 to obtain a cation exchange membrane. This membrane was treated in the same manner as in Example 1, and then the electrolysis was conducted in the same manner. The current efficiency was 96.5%, and the cell voltage was 3.02 V. The tensile elongation of this membrane was 45%, and the MIT type bending fatigue test was 30 times. On the other hand, in the case of a two-layered membrane composed solely of Films I and J, the current efficiency was 96.5%, and the cell voltage was 3.06 V.

EXAMPLE 6

Polymers made of a copolymer of

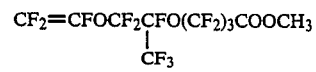

with tetrafluoroethylene and having ion exchange capacities of 0.9 meq/g dry resin, 1.2 meq/g dry resin and 1.4 meq/g dry resin, were formed into Films L, M and N having thicknesses of 20 μm, 150 μm and 10 μm, respectively. Films L, M and N were laminated in this order to obtain a three-layered membrane. The swelling degrees of the polymers of Films M and N were 17% and 22%, respectively, and the specific resistance was 100 Ω.cm and 60 Ω.cm respectively. The rest of the operation was conducted in the same manner as in Example 1 to obtain a cation exchange membrane. The electrolysis was conducted in the same manner as in Example 1, whereby the current efficiency was 96.5%, and the cell voltage was 3.03 V. The tensile elongation of this membrane was 30%, and the MIT type bending fatigue test was 15 times.

COMPARATIVE EXAMPLE 6

A cation exchange membrane was prepared in the same manner as in Example 6 except that Films L and M were laminated to form a two-layered membrane. The electrolysis was conducted in the same manner, whereby the current efficiency was 96%, and the cell voltage was 3.07 V. The tensil elongation of this membrane was 30%, and the MIT type bending fatigue test was 15 times.

EXAMPLE 7

Copolymerization of $CF_2=CF-O-(CF_2)_3COOCH_3$ with tetrafluoroethylene was conducted to obtain copolymers having ion exchange capacities of 1.2 meq/g dry resin, 1.4 meq/g dry resin and 1.8 meq/g dry resin, respectively. These copolymers were molded at 230° into Films A, B and C having thicknesses of 30 μm, 150 μm and 30 μm, respectively, swelling degrees of 11%, 17% and 35%, respectively, and a specific resistance of 2,500 Ω.cm, 150 Ω.cm and 35 Ω.cm, respectively. Further, a copolymer having an ion exchange capacity of 1.4 meq/g dry resin was molded at 230° C. into Film D having a thickness of 20 μm, a swelling degree of 17% and a specific resistance of 150 Ω.cm. Films A, B, C and D were laminated in this order at room temperature, and then a support web made of a composite woven fabric prepared by plane weave of 75 denier polytetrafluoroethylene fibers (27 fibers/inch) and 30 denier polyethyeneterephthalante fibers (54 fibers/inch) and having a thickness of 75 μm (the aspect ratio of the fibers: 5.0) was placed on the D layer of the laminate, and heated at 200° C. and pressed to obtain a reinforcing cloth-reinforced ion exchange membrane $M_1$ wherein the woven fabric is embedded in the D layer and even in a part of the C and B layers.

On the other hand, a mixture comprises 10 parts of zirconium oxide powder having an average particle size of 1 μm, 0.4 part of methyl cellulose (viscosity of 2% aqueous solution: 1500 centipoise), 19 parts of water, 2 parts of cyclohexanol and 1 part of cyclohexanone, was kneaded to obtain a paste. The paste was screen-printed on the D layer side of the laminated membrane. The printed layer formed on the membrane surface was dried in air. Then, on the A layer side i.e. the other side of the membrane having the printed layer, β-silicon carbide particles having an average particle size of 0.3 μm were likewise screen-printed and dried in air. Thereafter, the particle layers on the respective membrane surfaces were press-bonded to the ion exchange membrane at a temperature of 140° C. under a pressure of 30 kg/cm², to obtain an ion exchange membrane $M_2$ with zirconium oxide particles and silicon carbide particles deposited in an amount of 20 g/m² and 10 g/m², respectively, on the anode side and the cathode side of the membrane. Then, the ion exchange membranes $M_1$ and $M_2$ were dipped in a 25 wt % sodium hydroxide aqueous solution at 70° C. for 16 hours for the hydrolysis of the membranes.

To the D layer side of each membrane thus obtained, an anode prepared by coating a solid solution of ruthenium oxide, iridium oxide and titanium oxide on a titanium punched metal (short opening diameter 4 mm, long opening diameter: 8 mm) and having a low chlorine overvoltage, was pressed to be in contact with the membrane. Likewise, to the A layer side of the membrane, a cathode prepared by electrodepositing a ruthenium-containing Raney nickel on a SUS 304 punched metal (short opening diameter 4 mm, long opening diameter: 8 mm) and having a low hydrogen overvoltage, was pressed to be in contact with the membrane. Then, electrolysis was conducted at 90° C. at a current density of 30 A/dm², while supplying a 5N sodium chloride aqueous solution to the anode compartment and water to the cathode compartment, and maintaining the sodium chloride concentration in the anode compartment to a level of 3.5N and the sodium hydroxide concentration in the cathode compartment to a level of 35% by weight.

Upon expiration of 30 days, in the case where the ion exchange membrane $M_1$ was used, and cell voltage was 3.40 V, the current efficiency was 96.0%, and the sodium chloride content in the 35% sodium hydroxide aqueous solution was 9 ppm. On the other hand, in the case where the ion exchange membrane $M_2$ was used, the cell voltage was 2.97 V, the current efficiency was 96.0%, and the sodium chloride content in the 35% sodium hydroxide aqueous solution was 9 ppm.

COMPARATIVE EXAMPLE 7

An ion exchange membrane was prepared in the same manner as in Example 7 except that no reinforcing cloth was used in the preparation of the ion exchange membrane $M_2$ in Example 7, and the electrolysis was conducted in the same manner.

Upon expiration of 30 days, the cell voltage was 3.01 V, the current efficiency was 96.0% and the sodium chloride content in the 35% sodium hydroxide aqueous solution was 10 ppm.

COMPARATIVE EXAMPLE 8

An ion exchange membrane was prepared in the same manner as in Example 7 except that a D' layer having the same ion exchange capacity of 1.4 meq/g dry resin as the D layer and having a thickness of 30 μm was used instead of the C layer (ion exchange capacity 1.8 meq/g dry resin, thickness: 30 μm) in the laminated membrane $M_2$ of Example thickness 7, and the electrolysis was conducted in the same manner.

Upon expiration of 30 days, the cell voltage was 3.03 V, the current efficiency was 96.0%, and the sodium chloride content in the catholyte was 10 ppm.

COMPARATIVE EXAMPLE 9

An ion exchange membrane was prepared in the same manner as in Example 7 except that in the laminated membrane $M_2$ of Example 7, the D layer and the B layer were exchanged (the reinforcing cloth was present in the D layer only in view of the thickness), and the electrolysis was conducted in the same manner.

Upon expiration of 30 days, the cell voltage was 3.02 V, the current efficiency was 96.0%, and the sodium chloride content in the catholyte was 13 ppm.

COMPARATIVE EXAMPLE 10

An ion exchange membrane was prepared in the same manner as in Example 7, except that in the laminated membrane $M_2$ of Example 7, a C' layer having the same ion exchange capacity of 1.8 meq/g dry resin as the C layer and having a thickness of 200 μm, was used instead of the D, C and B layers, and the electrolysis was conducted in the same manner.

Upon expiration of 30 days, the cell voltage was 2.93 V, the current efficiency was 96.0%, the sodium chloride content in the catholyte was 20 ppm.

EXAMPLE 8

An ion exchange membrane was prepared in the same manner as in Example 7 ($M_2$) except that Film E made of a copolymer of

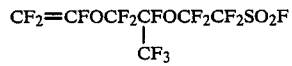

with tetrafluoroethylene and having an ion exchange capacity of 1.1 meq/g dry resin and a thickness of 20 μm (swelling degree: 22%, specific resistance: 50 Ω.cm) was used instead of the D layer having an ion exchange capacity of 1.4 meq/g dry resin in Example 7, and the electrolysis was conducted in the same manner.

Upon expiration of 30 days, the cell voltage was 2.95 V, the current efficiency was 96.0%, and the sodium chloride content in the catholyte was 10 ppm.

EXAMPLE 9

An ion exchange membrane was prepared in the same manner as in Example 7 (membrane $M_2$) except that a F layer (swelling degree: 28%, specific resistance: 42 Ω.cm) obtained by blending the copolymers constituting the E and C layers in a weight ratio of 1:1 and having a thickness of 30 μm, was used instead of the C layer (ion exchange capacity: 1.8 meq/g dry resin, thickness: 30 μm) in the laminate of Example 8, and the electrolysis was conducted in the same manner.

Upon expiration of 30 days, the cell voltage was 2.96 V, the current efficiency was 96%, and the sodium chloride content in the catholyte was 10 ppm.

EXAMPLE 10

Copolymerization of $CF_2=CF-O-(CF_2)_3COOCH_3$ with tetrafluoroethylene was conducted to obtain a copolymer having an ion exchange capacity of 1.2 meq/g dry resin, which was molded at 230° C. into Film A (specific resistance: 2,500 Ω.cm) having a thickness of 30 μm. Copolymerization of

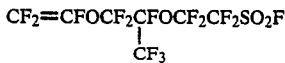

with tetrafluoroethylene was conducted to obtain copolymers having ion exchange capacities of 0.9 meq/g dry resin and 1.1 meq/g dry resin, respectively. The copolymers were molded at 230° C. to obtain Films B and D (specific resistance: 140 Ω.cm) and Film C (specific resistance: 22 Ω.cm) having thicknesses of 150 μm, 30 μm and 30μm, respectively.

Films A, B, C and D were laminated in this order at room temperature. Then, a porous substrate made of a composite woven fabric having a thickness of 80 μm made of fibers having a cross section of 40 μm in thickness and 250 μm in width and obtained by twisting 200 denier monofilaments obtained by tearing a PTFE film in a thickness of 20 μm and a width of 500 μm, 3.5 times per inch and flattening them, with a warp and weft count of 7.87 fibers/cm (the fibers had an aspect ratio of 6.7, and temporarily 50 denier rayon fibers with a warp and weft count of 15.75 fibers/cm), was placed on the D layer of the laminate, heated at 200 ° C. and pressed to obtain a reinforcing cloth-reinforced membrane wherein the woven fabric was embedded in the D layer and even in a part of the C and B layers.

The electrolysis was conducted in the same manner as in Example 1. Upon expiration of 30 days, the cell voltage was 3.4 V, the current efficiency was 96%, and the sodium chloride content in the catholyte was 9 ppm.

EXAMPLE 11

The tear strength of the hydrolyzed membranes in Examples 7 to 10 and Comparative Examples 7 to 10 was measured at room temperature. The results are shown in the following Table.

TABLE 1

| Membrane | Tear strength (g) |
| --- | --- |
| Membrane ($M_2$) in Example 7 | 4500 |
| Membrane in Example 8 | 4500 |
| Membrane in Example 9 | 4500 |
| Membrane in Example 10 | 5000 |
| Membrane in Comparative Example 7 | 130 |
| Membrane in Comparative Example 8 | 4500 |
| Membrane in Comparative Example 9 | 4500 |
| Membrane in Comparative Example 10 | 3500 |

We claim:

1. An ion exchange membrane for electrolysis comprising a first layer having a thickness of from 5 to 50 μm of a fluoropolymer having carboxylic acid groups as the first layer's ion exchange groups and facing a cathode, a second layer having a thickness of from 50 to 200 μm of a fluoropolymer having ion exchange groups, a specific resistance lower than that of the first layer by at least 10 Ω.cm and a thickness of at least 50% of the total thickness of the membrane, and a third layer having a thickness of from 10 to 50 μm of a fluoropolymer having ion exchange groups, a swelling degree higher by at least 5% than that of the second layer and a specific resistance lower by at least 30 Ω.cm than that of the second layer, the first, second and third layers being laminated in this order.

2. The membrane according to claim 1, wherein the ion exchange groups of the second layer are sulfonic acid groups or carboxylic acid groups, and the ion exchange groups of the third layer are sulfonic acid groups.

3. The membrane according to claim 2, wherein when adjacent layers have different ion exchange groups, an additional layer of a fluoropolymer having both carboxylic acid group and sulfonic acid groups is interposed between the adjacent layers.

4. The membrane according to claim 3, wherein the additional layer is made of a blend of a fluoropolymer having carboxylic acid groups and a fluoropolymer having sulfonic acid groups in a weight ratio of from 10/90 to 90/10.

5. The membrane according to claim 3, wherein the carboxylic acid groups have an ion exchange capacity of from 0.5 to 2.0 meq/g dry resin, and the sulfonic acid groups have an ion exchange capacity of from 0.5 to 1.5 meq/g dry resin.

6. The membrane according to claim 1, wherein at least the third layer is reinforced by a support web composed of sacrificial material and reinforcing material and having a thickness of from 30 to 200 μm.

7. The membrane according to claim 6, wherein the support web is a woven fabric composed of sacrificial fibers and reinforcing fibers.

8. The membrane according to claim 7, wherein the reinforcing fibers have a fineness of from 30 to 300 denier and an aspect ratio of from 2 to 20, and the sacrificial fibers have a fineness of from 30 to 300 denier.

9. The membrane according to claim 6, wherein the reinforcing material is a perfluorocarbon polymer, and the sacrificial material is a polyethylene terephthalate, nylon cellulose or rayon.

10. The membrane according to claim 1, wherein a gas releasing layer is provided on at least one of the anode and cathode sides of the membrane.

11. The membrane according to claim 10, wherein the gas releasing layer is a porous layer of hydrophilic inorganic particles having no electrocatalytic activity.

12. The membrane according to claim 10, wherein the gas releasing layer is a surface layer of the membrane with the gas releasing layer surface roughened.

13. An electrolytic cell which comprises anode and cathode compartments partitioned by the ion exchange membrane as defined in claim 1.

14. A process for electrolyzing an alkali metal chloride by using the electrolytic cell as defined in claim 13, wherein an aqueous alkali metal chloride solution is supplied to the anode compartment, and water or a dilute alkali metal hydroxide solution is supplied to the cathode compartment.

15. An ion exchange membrane for electrolysis comprising a first layer having a thickness of from 5 to 50 μm of a fluoropolymer having carboxylic acid groups as the first layer's ion exchange groups and facing a cathode, a second layer having a thickness of from 50 to 200 μm of a fluoropolymer having ion exchange groups, a specific resistance lower by at least 10 Ω.cm than that of the first layer and a thickness of at least 50% of the total thickness of the membrane, a third layer having a thickness of from 5 to 50 μm of a fluoropolymer having ion exchange groups, a swelling degree higher by at least 5% than that of the second layer and a specific resistance lower by at least 30 Ω.cm than that of the second layer, and a fourth layer having a thickness of from 5 to 50 μm of a fluoropolymer having ion exchange groups and a specific resistance higher by from 5 to 150 Ω.cm than that of the third layer, the first, second, third and fourth layers being laminated in this order.

16. The membrane according to claim 15, wherein the ion exchange groups of the second and third layers are sulfonic acid groups or carboxylic acid groups, and the ion exchange groups of the fourth layer are sulfonic acid groups.

17. The membrane according to claim 16, wherein when adjacent layers have different ion exchange groups, an additional layer of a fluoropolymer having both carboxylic acid groups and sulfonic acid groups is interposed between the adjacent layers.

18. The membrane according to claim 17, wherein the additional layer is made of a blend of a fluoropolymer having carboxylic acid groups and a fluoropolymer having sulfonic acid groups in a weight ratio of from 10/90 to 90/10.

19. The membrane according to claim 16, wherein the carboxylic acid groups have an ion exchange capacity of from 0.5 to 2.0; meq/g dry resin, and the sulfonic acid groups have an ion exchange capacity of from 0.5 to 1.5 meq/g dry resin.

20. The membrane according to claim 15, wherein at least the third and fourth layers are reinforced by a support web composed of sacrificial material and reinforcing material and having a thickness of from 30 to 200 μm.

21. The membrane according to claim 20, wherein the support web is a woven fabric composed of sacrificial fibers and reinforcing fibers.

22. The membrane according to claim 21, wherein the reinforcing fibers have a fineness of from 30 to 300 denier and an aspect ratio of from 2 to 20, and the sacrificial fibers have a fineness of from 5 to 200 deniers.

23. The membrane according to claim 20, wherein the reinforcing material is a perfluoropolymer, and the sacrificial material is a polyethylene terephthalate, nylon, cellulose or rayon.

24. The membrane according to claim 15, wherein a gas releasing layer is provided on at least one of the anode and cathode sides of the membrane 25. The membrane according to claim 25, wherein the gas releasing layer is a porous layer of hydrophilic inorganic particles having no electrocatalytic activity.

26. The membrane according to claim 25, wherein the gas releasing layer is a surface layer of the membrane with the gas releasing layer surface roughened.

27. An electrolytic cell which comprises anode and cathode compartments partitioned by the ion exchange membrane as defined in claim 15.

28. A process for electrolyzing and alkali metal chloride by using the electrolytic cell as defined in claim 27, wherein an aqueous alkali metal chloride solution is supplied to the anode compartment, and water or a dilute alkali metal hydroxide solution is supplied to the cathode compartment.

* * * * *